US008976476B1

(12) United States Patent
Lu et al.

(10) Patent No.: US 8,976,476 B1
(45) Date of Patent: Mar. 10, 2015

(54) STORAGE DEVICE WITH READ CHANNEL CIRCUITRY CONFIGURED TO PROVIDE CONTINUITY PROTECTION FOR SUBSECTOR STITCHING

(71) Applicant: LSI Corporation, San Jose, CA (US)

(72) Inventors: Lu Lu, Milpitas, CA (US); Haitao Xia, Milpitas, CA (US); Ku Hong Jeong, Milpitas, CA (US); Yuqing Yang, Shanghai (CN)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/250,587

(22) Filed: Apr. 11, 2014

(51) Int. Cl.
*G11B 5/09* (2006.01)

(52) U.S. Cl.
USPC ........................................................... 360/50

(58) Field of Classification Search
CPC ........... G11B 2220/90; G11B 20/1205; G11B 27/3027; G11B 5/00; G11B 5/02; G11B 5/59655; G11B 20/10009
USPC ................. 360/24, 25, 29, 45, 47, 48, 49, 50, 360/77.11
See application file for complete search history.

(56) References Cited

U.S. PATENT DOCUMENTS

| | | | | |
|---|---|---|---|---|
| 5,589,998 | A | 12/1996 | Yu | |
| 7,872,825 | B2 | 1/2011 | Sanghvi | |
| 8,136,016 | B1 | 3/2012 | Wu et al. | |
| 8,176,404 | B2 | 5/2012 | Yang et al. | |
| 8,321,763 | B1 | 11/2012 | Wu et al. | |
| 8,443,251 | B1 | 5/2013 | Zhang et al. | |
| 8,627,179 | B1 | 1/2014 | Wu et al. | |
| 8,631,311 | B1 | 1/2014 | Chan et al. | |
| 2012/0200954 | A1 | 8/2012 | Jin et al. | |
| 2012/0236429 | A1 | 9/2012 | Yang et al. | |
| 2013/0083417 | A1 | 4/2013 | Worrell et al. | |
| 2013/0332794 | A1 | 12/2013 | Yen et al. | |
| 2014/0019695 | A1 | 1/2014 | Singleton et al. | |
| 2014/0223114 | A1 * | 8/2014 | Wang et al. | 711/154 |

OTHER PUBLICATIONS

C. Douillard et al., "Iterative Correction of Intersymbol Interference: Turbo-Equalization," European Transactions on Telecommunications, Sep./Oct. 1995, pp. 507-511, vol. 6, No. 5.

* cited by examiner

*Primary Examiner* — Nabil Hindi
(74) *Attorney, Agent, or Firm* — Hamilton DeSanctis & Cha

(57) ABSTRACT

A hard disk drive or other storage device comprises a storage medium, a read/write head, and read channel circuitry coupled to the read/write head. The read channel circuitry comprises a despreader configured to generate a stitched logic sector by stitching together subsectors of that logic sector that were interleaved with subsectors of other logic sectors for storage on the storage medium, and a subsector bridging control module configured to control a number of bridging bits inserted by the despreader between a given pair of adjacent subsectors of the stitched logic sector. The subsector bridging control module may be illustratively configured to cause the despreader to insert a sufficient number of bridging bits between each pair of adjacent subsectors of the stitched logic sector so as to prevent discontinuities that might otherwise arise from use of X-averaging in generation of Y samples from X samples in a retry mode of operation.

20 Claims, 17 Drawing Sheets

PHASE 1
PHYSICAL READ AND AVERAGE

PHASE 2/3
REPLAY AND DECODE

STORAGE DEVICE WITH READ CHANNEL CIRCUITRY CONFIGURED TO PROVIDE CONTINUITY PROTECTION FOR SUBSECTOR STITCHING

FIELD OF INVENTION

The field relates generally to storage devices, and more particularly to read channel circuitry in storage devices.

BACKGROUND

Disk-based storage devices such as hard disk drives (HDDs) are commonly used to provide non-volatile data storage in a wide variety of different types of data processing systems. In a typical HDD, data is read from and written to tracks of a magnetic storage disk using read channel circuitry that is coupled to a read/write head of the HDD via a preamplifier. The read channel circuitry processes data read from the disk using the read/write head and the preamplifier. The read channel circuitry also provides write data to a write driver of the preamplifier for recording on the storage disk using the read/write head.

SUMMARY

In some HDDs, logic sectors of the storage disk are each separated or "sliced" into multiple subsectors in conjunction with reading of the corresponding recorded data from the storage disk. This can create issues in certain operating modes of the storage device, such as a retry mode of operation in which read data for a given logic sector that has not converged to an appropriate state in an initial pass through the read channel circuitry is further processed in an attempt to achieve convergence for that logic sector.

In one embodiment, an HDD or other storage device comprises a storage medium, a read/write head, and read channel circuitry coupled to the read/write head. The read channel circuitry comprises a despreader configured to generate a stitched logic sector by stitching together subsectors of that logic sector that were interleaved with subsectors of other logic sectors for storage on the storage medium, and a subsector bridging control module associated with the despreader and configured to control a number of bridging bits inserted by the despreader between a given pair of adjacent subsectors of the stitched logic sector. For example, the subsector bridging control module may be configured to cause the despreader to insert a sufficient number of bridging bits between each pair of adjacent subsectors of the stitched logic sector so as to prevent discontinuities that might otherwise arise from use of X-averaging in generation of Y samples from X samples in a retry mode of operation.

Other embodiments of the invention include but are not limited to methods, apparatus, systems, processing devices, integrated circuits and computer-readable storage media having computer program code embodied therein.

WRITTEN DESCRIPTION

Embodiments of the invention will be illustrated herein in conjunction with exemplary storage devices comprising read channel circuitry. It should be understood, however, that these and other embodiments of the invention are more generally applicable to any storage device in which it is desirable to provide continuity protection when stitching subsectors of a logic sector in conjunction with reading data from a storage disk. Additional embodiments may be implemented using components other than those specifically shown and described in conjunction with the illustrative embodiments.

Figure 1:
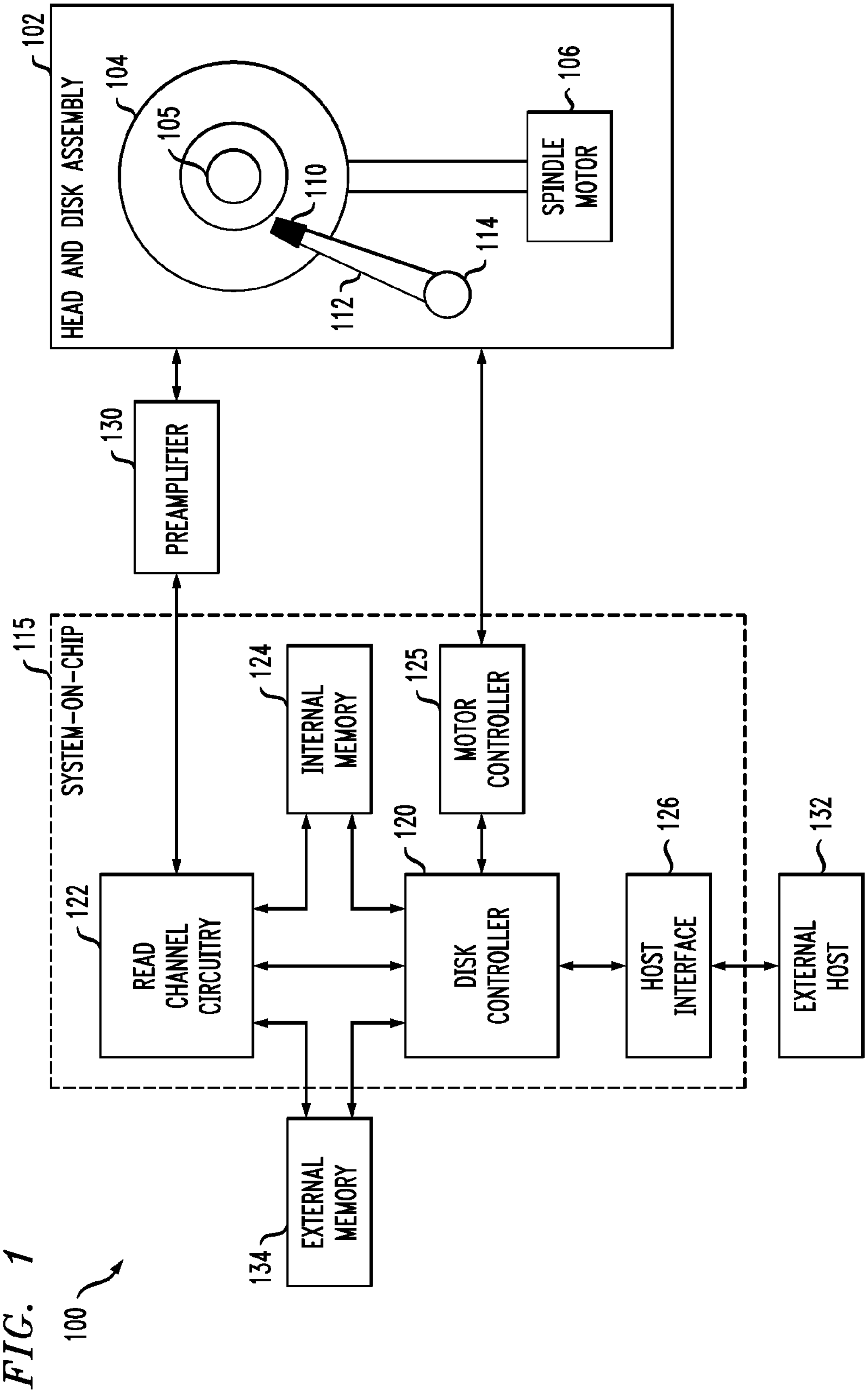
FIG. 1 shows a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a head and disk assembly 102 comprising a storage disk 104. The storage disk 104 has at least one storage surface coated with one or more magnetic materials that are capable of storing data bits in the form of respective groups of media grains oriented in a common magnetization direction (e.g., up or down). The storage disk 104 is connected to a spindle 105. The spindle 105 is driven by a spindle motor 106 in order to spin the storage disk 104 at high speed.

Data is read from and written to the storage disk 104 via a read/write head 110 that is mounted on a positioning arm 112. The position of the read/write head 110 over the magnetic surface of the storage disk 104 is controlled by an electromagnetic actuator 114 attached to the positioning arm 112.

The storage surface of storage disk 104 in the present embodiment is assumed to comprise a plurality of concentric tracks. Each track is subdivided into physical data sectors each of which is capable of storing a block of data for subsequent retrieval. The tracks located toward the outside edge of the storage disk have a larger circumference when compared to those located toward the center of the storage disk. The tracks are grouped into several annular zones, where the tracks within a given one of the zones have the same number of sectors. Those tracks in the outer zones have more sectors than those located in the inner zones.

The outer zones of the storage disk 104 provide a higher data transfer rate than the inner zones. This is in part due to the fact that the storage disk in the present embodiment, once accelerated to rotate at operational speed, spins at a constant angular or radial speed regardless of the positioning of the read/write head 110, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Each data sector further comprises additional information such as, for example, a synchronization mark, a preamble, error correction code (ECC) information and padding, arranged in accordance with a particular data storage format. Exemplary data storage formats include 512-byte sector formats and 4K-byte sector formats. The latter are examples of what are also referred to as Advanced Format.

The storage disk 104 is also assumed to include servo sectors distributed over the surface of the disk. Such servo sectors are typically written at very high precision in conjunction with manufacture of the storage disk. The servo sectors provide a timing pattern comprising servo address marks (SAMs) and other information.

The particular storage disk configurations described above are presented for purposes of illustration only, and should not be construed as limiting in any way. A wide variety of other storage disk configurations may be used in other embodiments.

It is to be appreciated that, although FIG. 1 shows an embodiment of the invention in which the head and disk assembly 102 comprises only one instance of each of the storage disk 104, read/write head 110, and positioning arm 112, this is by way of illustrative example only, and alternative embodiments of the invention may comprise multiple instances of one or more of these or other HDD components. For example, one such alternative embodiment may comprise multiple storage disks each like storage disk 104 and attached to the same spindle 105 so all such disks rotate at the same speed, and multiple read/write heads and associated positioning arms coupled to one or more actuators.

As another example, in other embodiments there may be multiple read/write heads arranged on a given positioning arm, rather than a single read/write head on the positioning arm as illustrated in the FIG. 1 embodiment.

Additionally or alternatively, both sides of storage disk 104 and any other storage disks in a particular embodiment may be used to store data and accordingly may be subject to read and write operations, through appropriate configuration of one or more read/write heads.

A given read/write head as that term is broadly used herein may be implemented in the form of a combination of separate read and write heads. More particularly, the term “read/write” as used herein is intended to be construed broadly as read and/or write, such that a read/write head may comprise a read head only, a write head only, a single head used for both reading and writing, or a combination of separate read and write heads. A given read/write head such as read/write head 110 may therefore include both a read head and a write head. Such heads may comprise, for example, heads with wrap-around or side-shielded main poles, or any other types of heads suitable for recording and/or reading data on a storage disk. Read/write head 110 when performing read operations or write operations may be referred to herein as simply a read head or a write head, respectively.

The storage device 100 as illustrated in FIG. 1 further comprises a system-on-chip (SOC) 115 that includes a disk controller 120, read channel circuitry 122, internal memory 124, a motor controller 125 and a host interface 126. The SOC 115 in the present embodiment directs the operation of the head and disk assembly 102 in reading data from and writing data to the storage disk 104. For example, the SOC 115 is generally configured to process data received from and supplied to the read/write head 110 and to control positioning of the read/write head 110 relative to the storage disk 104.

The SOC 115 is an example of what is more generally referred to herein as an “integrated circuit.” The particular storage device components that are incorporated within the SOC can vary in other embodiments. For example, in some embodiments, components such as the motor controller 125 and host interface 126 can each be implemented as a separate integrated circuit rather than as part of the SOC 115. Also, in other embodiments, the components need not be part of an SOC at all, but could instead be implemented, for example, using one or more separate integrated circuits for each of the disk controller 120, the read channel circuitry 122 and possibly other components.

An exemplary SOC that may be modified for use in embodiments of the invention is disclosed in U.S. Pat. No. 7,872,825, entitled “Data Storage Drive with Reduced Power Consumption,” which is commonly assigned herewith and incorporated by reference herein. Other types of integrated circuits that may be used to implement one or more of disk controller 120, read channel circuitry 122, internal memory 124, motor controller 125, host interface 126 or other storage device components of a given embodiment include, for example, a microprocessor, digital signal processor (DSP), application-specific integrated circuit (ASIC), field-programmable gate array (FPGA) or other integrated circuit device.

Portions of the storage device 100 may therefore be implemented at least in part in the form of one or more integrated circuits, such as otherwise conventional integrated circuits designed for use in an HDD and suitably modified to implement subsector stitching functionality as disclosed herein.

In an embodiment comprising an integrated circuit implementation, multiple integrated circuit dies may be formed in a repeated pattern on a surface of a wafer. Each such die may include, for example, at least a portion of read channel circuitry 122, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

The read channel circuitry 122 is coupled to the head and disk assembly 102 via a preamplifier 130. Although illustratively shown as being separate from the head and disk assembly 102, the preamplifier 130 in some embodiments comprises an integrated circuit arranged on the positioning arm 112. Accordingly, the preamplifier in such an arrangement may be viewed as part of the head and disk assembly 102.

The internal memory 124 is internal to the SOC 115 and portions thereof are utilizable by the disk controller 120 and the read channel circuitry 122, and possibly other storage device components. The internal memory 124 illustratively comprises electronic memory such as random access memory (RAM), read-only memory (ROM) or other types of electronic memory, in any combination. In other embodiments, such portions of internal memory 124 may be at least partially incorporated within the disk controller 120, read channel circuitry 122 or other storage device component.

The host interface 126 provides an interface between the SOC 115 and an external host 132, which may comprise, for example, a computer, server, communication device or other processing device in which the storage device 100 is installed. The external host 132 in the present embodiment is therefore considered a separate device that is not part of the storage device 100. Instructions such as read commands and write commands directed to the storage device 100 may originate from the external host 132. The external host 132 is assumed to comprise processor and memory elements similar to those previously described.

Also associated with the storage device 100 is external memory 134. Like the internal memory 124, the external memory 134 illustratively comprises electronic memory such as RAM or ROM, in any combination. In the present embodiment, it is assumed without limitation that the external memory 134 is implemented at least in part as a double data rate (DDR) synchronous dynamic RAM (SDRAM), although a wide variety of other types of memory may be used in other embodiments.

It should be noted that certain operations of the storage device 100 of FIG. 1 may be performed at least in part under the control of software stored in one or more of internal memory 124 and external memory 134 of the SOC 115. Additionally or alternatively, software stored in a memory of the external host 132 may be used for this purpose. Thus, at least a portion of the functionality of the storage device 100 may be implemented at least in part in the form of software. By way of example, the storage device 100 may be configured under software control to operate in a variety of different modes of operation, including on-the-fly modes, retry modes and possibly other modes, some of which involve subsector stitching. Additional details regarding these modes of operation will be provided below.

The internal and external memories 124 and 134 and memory of the external host 132 are examples of what are more generally referred to herein as "computer-readable storage media." Articles of manufacture comprising such computer-readable storage media are considered embodiments of the invention. The term "article of manufacture" as used herein should be understood to exclude transitory, propagating signals.

A given computer-readable storage medium has computer program code embodied therein, and may comprise, for example, electronic memory, magnetic memory, optical memory, or other types of memory in any combination.

It is to be appreciated that the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
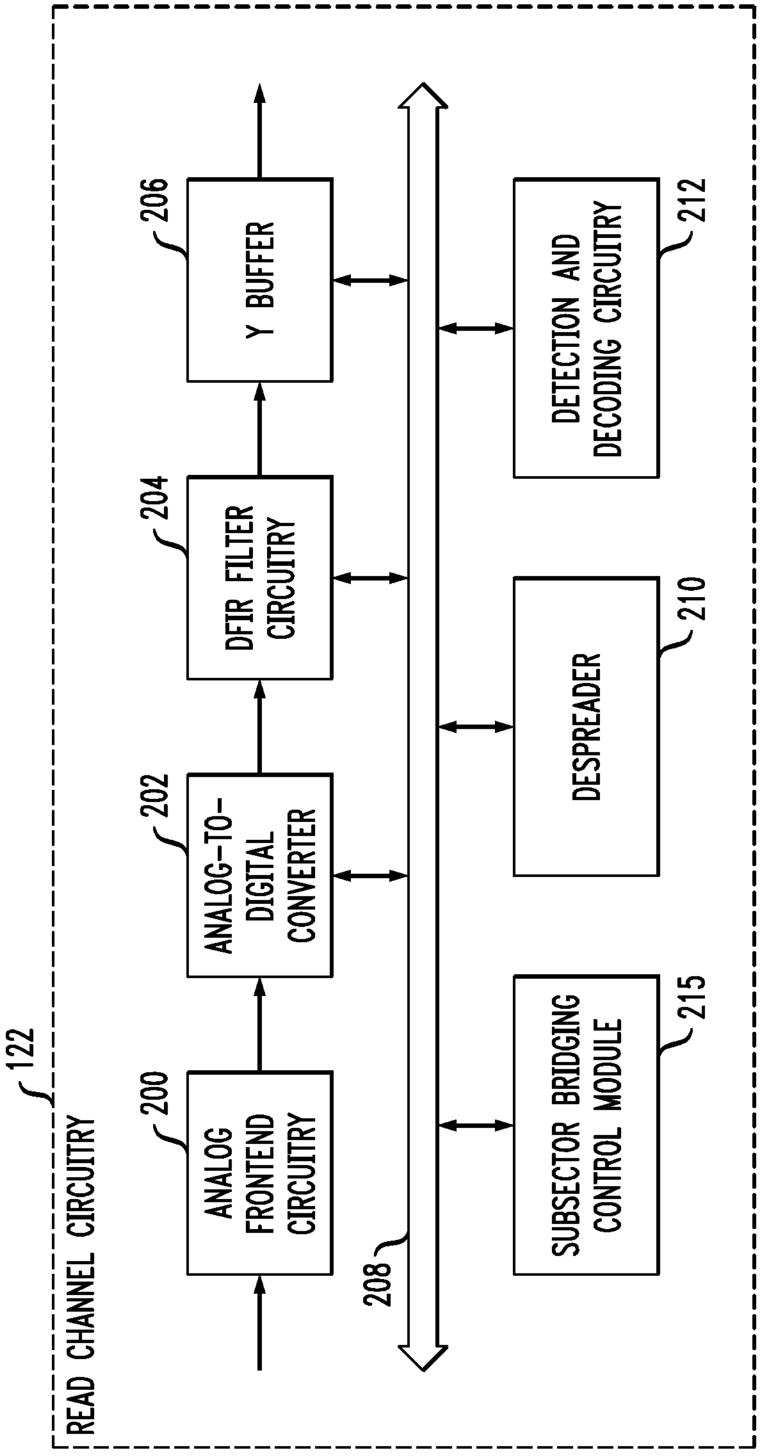
FIG. 2 shows a more detailed view of a portion of the read channel circuitry of the FIG. 1 storage device.

FIG. 2 shows a more detailed view of a portion of the read channel circuitry 122 of the storage device 100. In this embodiment, the read channel circuitry 122 comprises analog frontend circuitry 200 that receives one or more analog read signals from the read/write head 110 via the preamplifier 130. The analog frontend circuitry 200 illustratively comprises, for example, a variable gain amplifier (VGA) and an equalizer, although it can include additional or alternative components in other embodiments. The output of the analog frontend circuitry 200 is coupled to an input of an analog-to-digital converter (ADC) 202. The ADC 202 converts each analog read signal to a corresponding digital read signal.

A given digital read signal from ADC 202 is filtered in digital finite impulse response (DFIR) filter circuitry 204. For example, in some embodiments, X samples of a digital read signal at the output of the ADC 202 are filtered in the DFIR filter circuitry 204 to yield Y samples. The resulting Y samples are stored in Y buffer 206. The DFIR filter circuitry 204 illustratively comprises at least one multiple-tap DFIR filter implemented in accordance with the following equation:

$$y(n)=\Sigma_{i=-j_1}^{j2} a_i x(n-i)$$

where $a_i$ denotes a coefficient corresponding to a particular filter tap, x(n−i) denotes an X sample corresponding to a particular filter tap and y(n) denotes a Y sample. In an arrangement of this type, the number of DFIR taps is given by $1+j_1+j_2$. For a 16-tap DFIR, exemplary values of $j_1$ and $j_2$ are $j_1=7$ and $j_2=8$.

Figure 3:
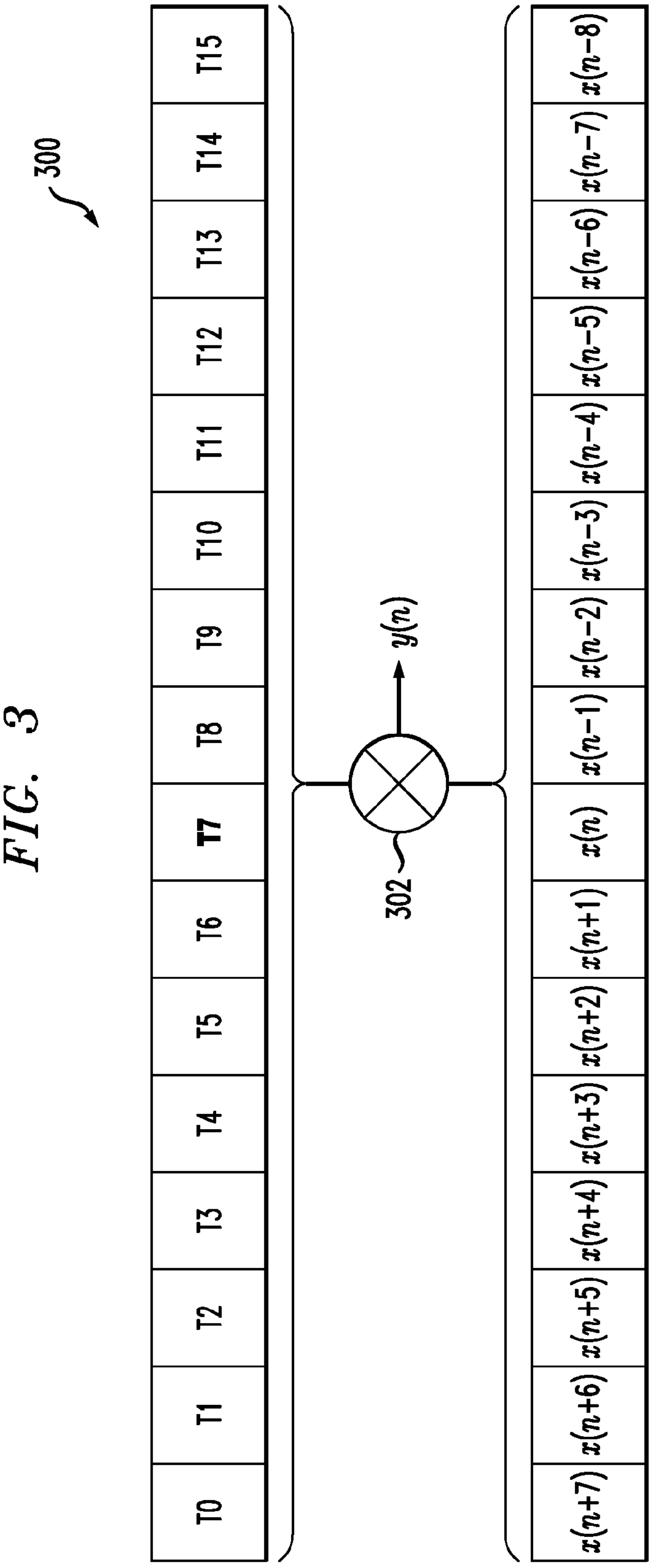
FIG. 3 shows an exemplary digital finite impulse response (DFIR) filter configuration in an illustrative embodiment.

FIG. 3 shows a DFIR filter 300 having this exemplary configuration. The DFIR filter 300 comprises 16 taps, denoted T0 through T15. The main DFIR filter tap, corresponding to i=0 and therefore X sample x(n−i)=x(n), is tap T7. The DFIR filter taps for $j_1=7$ and $j_2=8$ are taps T0 and T15, respectively, which correspond to i=−7 and i=8 and therefore X samples x(n−i)=x(n+7) and x(n−i)=x(n−8), respectively. A signal combiner 302 operates to combine the outputs of the taps T0 through T15 as applied to their respective corresponding X samples x(n+7) through x(n−8) in order to produce the Y sample y(n).

The DFIR filter 300 as shown in FIG. 3 is presented by way of illustrative example only. Alternative 16-tap filters may use different values for $j_1$ and $j_2$, such as $j_1=6$ and $j_2=9$. Also, the DFIR filter 300 can be implemented using different numbers of taps, such as 12 taps, or other numbers of taps greater than or less than 16. These and other filters as well as combinations thereof can be used in other embodiments.

Referring again to FIG. 2, the DFIR filter circuitry 204 illustratively comprises one or more DFIR filters of the type described above. Such filters may have coefficients or numbers of taps that are adjustable under software control. At least one filter of the DFIR filter circuitry 204 is referred to elsewhere herein as a backend DFIR filter in that it is implemented in a backend portion of the read channel circuitry 122 after the conversion of an analog read signal to a digital read signal in ADC 202. The read channel circuitry 122 in some embodiments further comprises at least one frontend DFIR filter that is implemented, by way of example, in the analog frontend circuitry 200.

Also included in the portion of the read channel circuitry 122 shown in FIG. 2 is a despreader 210 and detection and decoding circuitry 212. These read channel circuitry elements interact with one another and with one or more of the ADC 202, DFIR filter circuitry 204 and Y buffer 206 via a bus 208.

The bus 208 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus 208 may also be used to support communications between other system components, such as between the read channel circuitry 122 and the preamplifier 130. It should be understood that AXI interconnects are not required, and that a wide variety of other types of bus configurations may be used in embodiments of the invention.

It is assumed that the storage device 100 is operable in one or more modes in which logic sectors of the storage disk 104 are each separated or "sliced" into multiple subsectors. As noted above, this can create issues in certain operating modes of the storage device, such as a retry mode of operation in which read data for a given logic sector that has not converged to an appropriate state in an initial pass through the read channel circuitry is further processed in an attempt to achieve convergence for that logic sector.

By way of example, in some embodiments, different logic sectors are separated into multiple subsectors and the subsectors are interleaved together to form a large media sector. The large media sector is read from the storage disk 104 and processed through the read channel circuitry 122. After one or more global iterations of the detection and decoding circuitry 212, any converged logic sectors are "kicked out" or output from the read channel circuitry 122 as decoded read data. This decoded read data is generated in what is referred to herein as an "on-the-fly" mode of operation, as distinguished from a retry mode of operation. For each remaining non-converged logic sector, its subsectors are stitched together utilizing the despreader 210 and then further processed through the detection and decoding circuitry 212 in an exemplary retry mode of operation.

Additional details regarding detection and decoding operations that may be implemented using detection and decoding circuitry 212 in some embodiments are disclosed in U.S. Pat. No. 8,176,404, entitled "Systems and Methods for Stepped Data Retry in a Storage System," which is commonly assigned herewith and incorporated by reference herein. A wide variety of other known detection and decoding operations suitable for use in storage device 100 will be readily apparent to those skilled in the art.

In conjunction with a retry mode of the type described above, X samples of the various subsectors of each logic sector are illustratively subject to an X-averaging operation prior to stitching those subsectors together to form the stitched logic sector. This can create discontinuities at the stitching boundaries between the subsectors, resulting in significantly degraded performance when processing the stitched logic sector.

The read channel circuitry 122 of storage device 100 is advantageously configured to avoid the above-described discontinuities and associated performance problems that might otherwise arise when stitching subsectors of a logic sector of the storage disk 104. The stitching of subsectors in the present embodiment utilizes particular numbers of bridging bits determined using a subsector bridging control module 215 that communicates with at least the despreader 210 over the bus 208.

For example, in some embodiments, the read channel circuitry 122 is configured to provide continuity protection for subsector stitching by configuring the despreader 210 and its associated subsector bridging control module 215 to ensure that sufficient bridging bits are provided between stitched subsectors of the logic sector. This is achieved, for example, by storing a particular number of bridging bits between subsectors in the despreader 210 under the control of the subsector bridging control module 215. Such an arrangement can be used to ensure that discontinuities between stitched subsectors are substantially eliminated.

It should be noted that terms such as "stitching" and "stitched" as used herein in relation to subsectors of a logic sector are intended to be broadly construed to as to encompass a wide variety of different techniques for combining information from the subsectors so as to form the corresponding logic sector. Examples of subsector stitching are described in more detail below in conjunction with FIGS. 7-10 and 14-17, although numerous other types of subsector stitching can be used in other embodiments. Such stitching can be applied to subsector data as well as other related information associated with a given subsector. Additionally or alternatively, stitching can be applied to associated portions of digital read signals. Terms such as "sector" and "subsector" can therefore refer to data or other information recorded on or read from a storage medium, or a corresponding signal that carries such information. A "logic sector" can be any arrangement of information that is separated into distinct portions for interleaving. Also, the term "bridging bits" as used herein is intended to be broadly construed so as to encompass not only warm-up bits, cool-down bits and padding bits but also additional bits that are inserted between subsectors to avoid discontinuities in the manner disclosed herein.

Although shown as a separate component in the read channel circuitry 122 of FIG. 2, the subsector bridging control module 215 in other embodiments may be wholly or partially incorporated into another read channel circuitry component, such as, for example, the despreader 210. Moreover, as indicated elsewhere herein, at least portions of the despreader 210, subsector bridging control module 215, and possibly other read channel circuitry components can be implemented at least in part in the form of software stored in a memory and executed by a processor.

The particular read channel circuitry configuration illustrated in FIG. 2 is presented by way of example only, and should not be considered limiting in any way. Those skilled in the art will recognize that numerous other circuitry configurations may be used to implement the described functionality. Accordingly, the term "read channel circuitry" as utilized herein is intended to be broadly construed so as to encompass circuitry such as the above-noted microprocessor, DSP, ASIC, FPGA or other integrated circuit devices, as well as various portions and combinations of these and other circuitry types.

Figure 4:
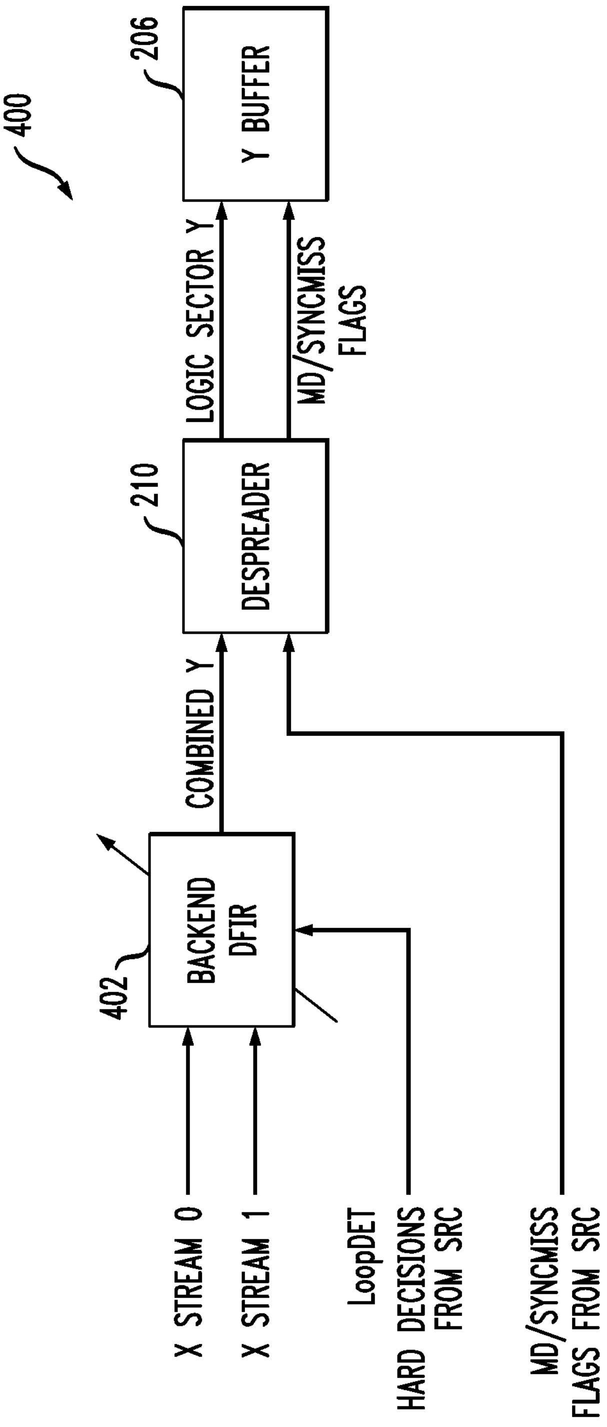
FIG. 4 illustrates an exemplary operating configuration of a portion of the FIG. 2 read channel circuitry in an on-the-fly mode of operation.

FIG. 4 illustrates an exemplary operating configuration of a portion 400 of the read channel circuitry 122 in an on-the-fly mode of operation. The portion 400 includes backend DFIR filter 402, Y buffer 206 and despreader 210. The backend DFIR filter 402 is part of the DFIR filter circuitry 204, and is illustratively configured as a variable filter. The backend DFIR filter 402 receives two streams of X samples, denoted as X Stream 0 and X Stream 1, and generates combined Y samples that are stored in despreader 210.

The two received streams X Stream 0 and X Stream 1 in the present embodiment are assumed to comprise respective digital read signal streams read by respective ones of two physically separated read heads from the same track of the storage medium. The two read heads have different head offsets on the track.

The despreader 210 combines the interleaved subsectors of a given logic sector to form the Y samples for that logic sector for storage in the Y buffer 206. The DFIR filter 402 and despreader 210 receive control signals as illustrated. For example, the DFIR filter 402 receives a loop detector signal ("LoopDET") and corresponding hard decisions (HDs), and the despreader 210 receives media defect (MD) and synchronization miss ("Syncmiss") flags. These control signals in the present embodiment are illustratively received from corresponding portions of an SRC hierarchy of the storage device 100, where SRC collectively denotes "servo, read/write interface and control loop" and comprises at least portions of the SOC 115, such as portions of the disk controller 120, read channel circuitry 122 and motor controller 125. However, it is to be appreciated that these control signals are exemplary only, and other control signals can be used in other embodiments. The despreader 210 provides the logic sector Y samples and the corresponding MD/Syncmiss flags to the Y buffer 206.

Figure 5:
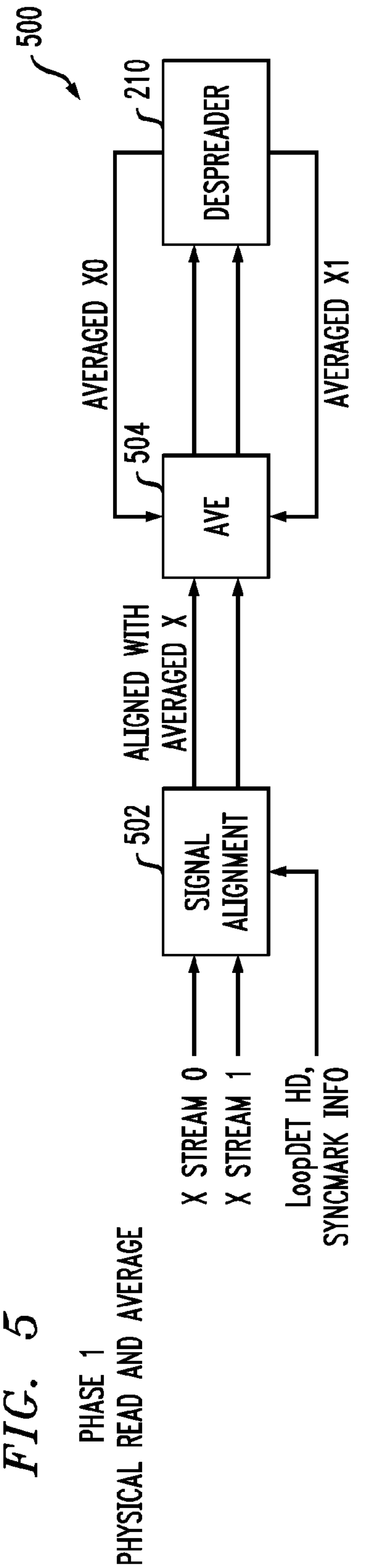
FIGS. 5 and 6 illustrate exemplary operating configurations of portions of the FIG. 2 read channel circuitry in a retry mode of operation.
Figure 6:
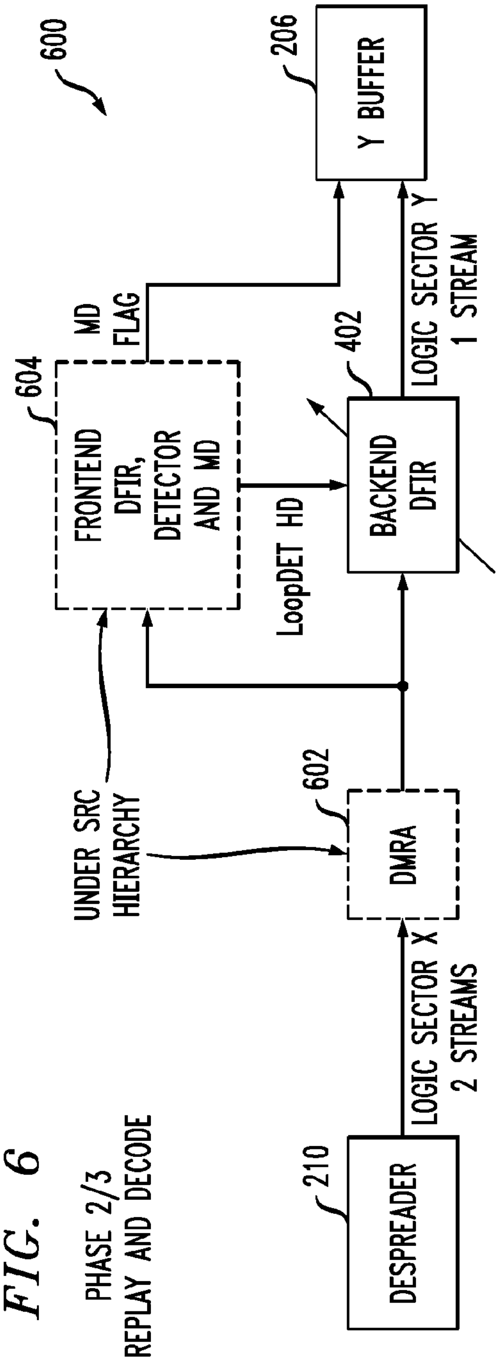

FIGS. 5 and 6 illustrate exemplary operating configurations of portions of the read channel circuitry 122 in a retry mode of operation. The retry mode in this embodiment illustratively includes three distinct phases, denoted Phase 1, Phase 2 and Phase 3, which do not overlap with one another. Other types of retry modes including different numbers of possibly overlapping phases may be used in other embodiments.

Referring initially to FIG. 5, an operating configuration associated with Phase 1 of the retry mode is shown. In this configuration, portion 500 of the read channel circuitry 122 performs a physical read of a large media sector comprising interleaved subsectors of multiple logic sectors. The new input X samples from the two streams X Stream 0 and X Stream 1 are aligned in a signal alignment module 502 and the resulting aligned outputs are provided to an averaging module 504 for averaging with previously-averaged X samples ("averaged X0" and "averaged X1") retrieved from despreader 210. The resulting new averaged X samples are stored back into the despreader 210. The despreader 210 is illustratively configured to store X samples for up to a designated maximum number of logic sectors, such as four logic sectors. The signal alignment module 502 receives control signals comprising a LoopDET HD and synchronization mark ("Syncmark") information.

FIG. 6 shows an operating configuration associated with Phases 2 and 3 of the exemplary retry mode. In this configuration, portion 600 of the read channel circuitry 122 performs replay and decode operations.

More particularly, in Phase 2, the two streams of averaged X samples from the despreader 210 as obtained in Phase 1 are replayed using digital magnetic resonance asymmetry (DMRA) module 602, frontend DFIR, detector and MD module 604, backend DFIR 402 and Y buffer 206. It should be noted that multiple logic sectors can be replayed in parallel from the despreader 210 to the Y buffer 206 and the resulting converged logic sectors "kicked out" as in the on-the-fly mode.

The DMRA module 602 is used to reconstruct linearity that may have been lost in a head transducer stage during conversion of a magnetic signal on the disk to an electrical signal at the output of the head. The modules 602 and 604 are shown in dashed outline and are illustratively under the above-noted SRC hierarchy. In other embodiments, alternative components of a type known to those skilled in the art can be used to implement detection and decoding operations in the portion 600 of the read channel circuitry 122.

In Phase 3, virtual retry operations are performed using selected logic sectors that did not converge in Phase 2. For a given such logic sector, the X samples are replayed from the despreader 210 to the Y buffer, with re-equalization and backend DFIR re-adaptation being performed possibly multiple times. If inter-track interference (ITI) is being addressed, Y samples for one or more adjacent tracks can be obtained and stored in the Y buffer 206 for use in ITI reduction. After all needed data is obtained to perform the virtual retry operation for a given logic sector, a retry gate signal is issued to trigger execution of the virtual retry operation. The operation can be repeated multiple times as needed with different retry features enabled on each iteration.

The continuity protection provided using despreader 210 and its associated subsector bridging control module 215 in a retry mode of operation will now be described in more detail with reference to FIGS. 7, 8 and 9.

Figure 7:
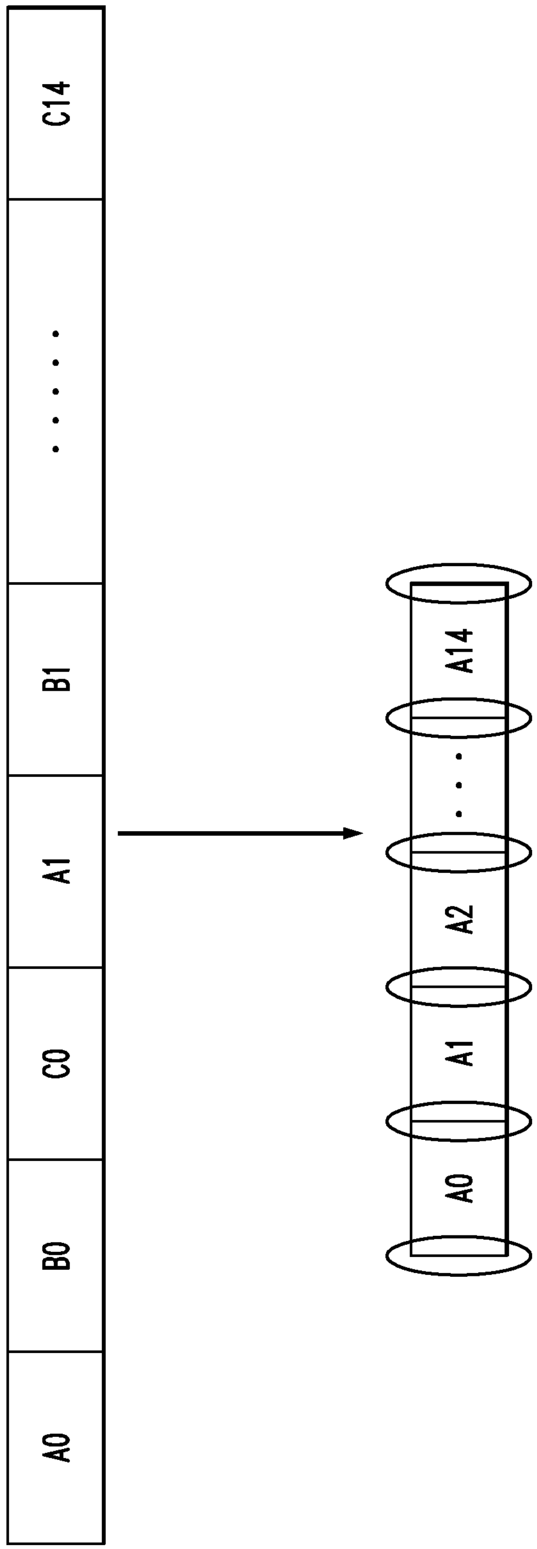
FIGS. 7, 8 and 9 illustrate exemplary features of bridging control for stitched subsectors of a given logic sector in one embodiment.

FIG. 7 shows an exemplary media sector that is formed by interleaving subsectors of three different logic sectors denoted A, B and C. More particularly, the upper portion of the figure shows the media sector comprising a sequence of interleaved subsectors A0, B0, C0, A1, B1, . . . C14. Each of the logic sectors in this example is assumed to comprise 15 subsectors, including subsectors A0 through A14 for logic sector A, subsectors B0 through B14 for logic sector B, and subsectors C0 through C14 for logic subsector C.

It is further assumed in this example that logic sectors B and C converge after one or more global iterations of the detection and decoding circuitry 212, and are "kicked out" as decoded read data in the on-the-fly mode of operation, leaving only logic sector A as a non-converged logic sector to be processed in a retry mode of operation.

Accordingly, the subsectors A0, A1, . . . A14 of logic sector A are stitched together as illustrated in the lower portion of the figure. This stitching is achieved using the despreader 210 and its associated subsector bridging control module 215 to determine an appropriate number of bridging bits to insert between the stitched subsectors. The stitched subsectors including the bridging bits between subsectors are then subject to retry mode processing of the type previously described.

Figure 8:
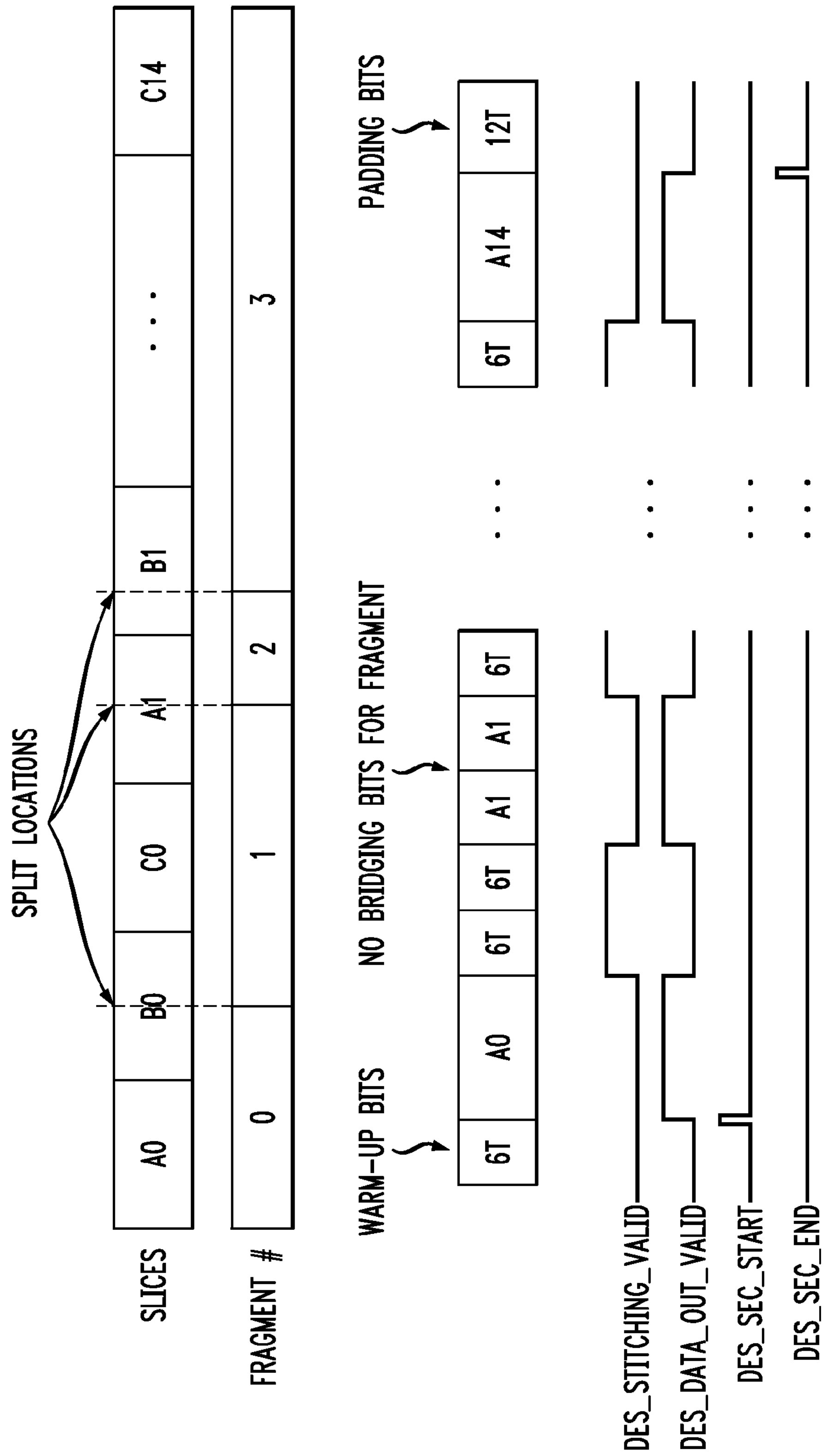

Referring now to FIG. 8, the manner in which the interleaved subsectors of the media sector are split across disk fragments is illustrated. More particularly, in this example, split locations between fragments are illustrated by vertical dashed lines. Thus, subsector B0 is split between fragments 0 and 1, subsector A1 is split between fragments 1 and 2, and subsector B1 is split between fragments 2 and 3. In the stitched logic sector A illustrated in this example, there are 6 warm-up bits preceding each subsector, 6 cool-down bits following each subsector other than the final subsector A14, and 12 padding bits following subsector A14, where T generally denotes a bit period and corresponds to a single clock cycle.

The FIG. 8 arrangement may be viewed as an exemplary Y samples interface configuration of the read channel circuitry 122. It can be seen that there are no bridging bits between the two split portions of the subsector A1.

Figure 9:
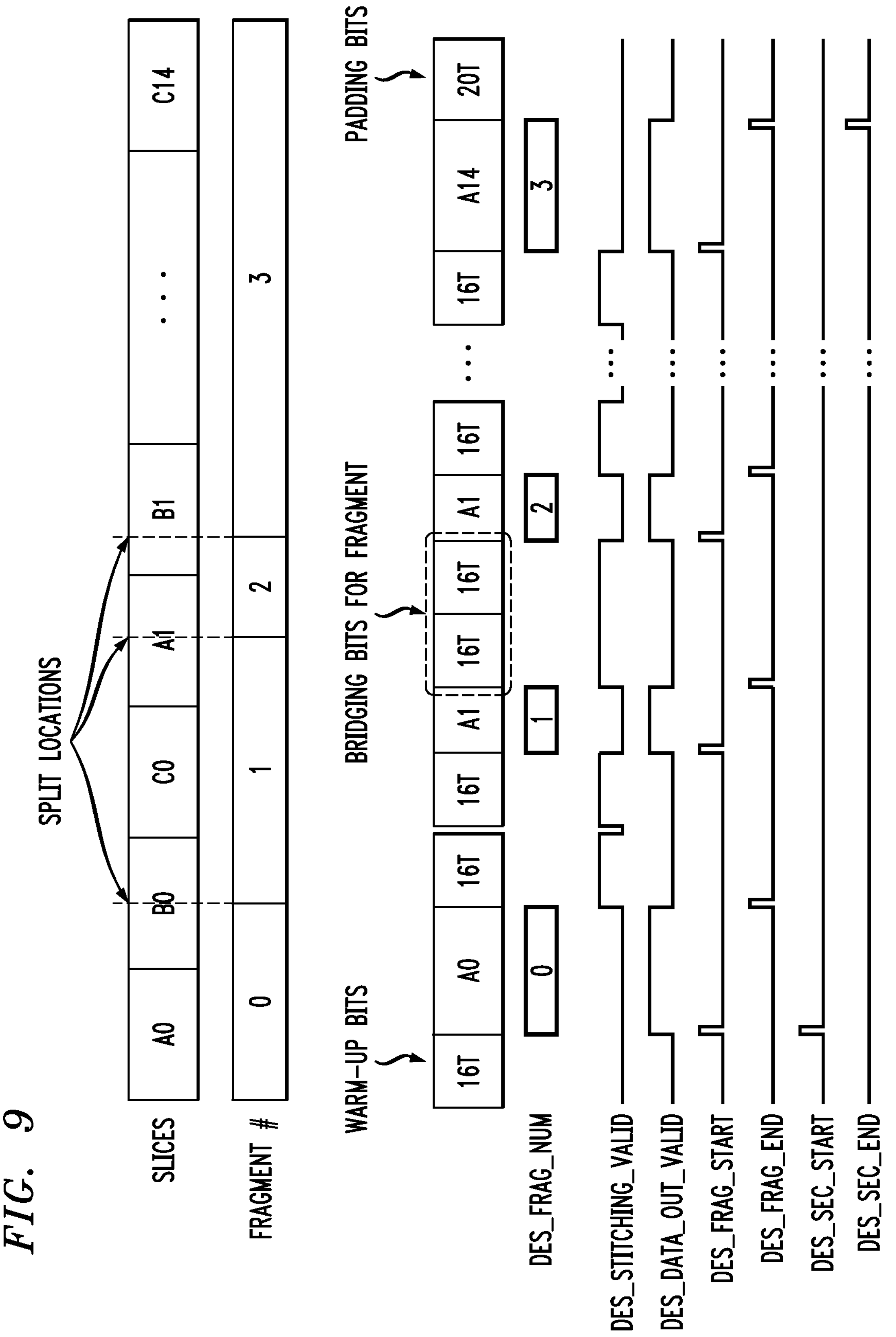

FIG. 9 illustrates an arrangement of X samples for the stitched logic sector A, including additional bridging bits at various locations configured to eliminate any potential discontinuity problems. It is assumed that the particular number of bridging bits used at a given such location is automatically determined under the control of the subsector bridging control module 215 and inserted at least in part utilizing despreader 210.

The manner in which the number of bridging bits is determined for this example will now be described, under an assumption that the backend DFIR filter comprises the 16-tap DFIR filter 300 of FIG. 3. For this DFIR filter, the main tap is T7, and to generate each Y sample y(n), 16 X samples x(n−8) to x(n+7) are used. These correspond to 8 previous and 7 subsequent X samples relative to the current sample. Accordingly, in order to ensure that each Y sample can be generated in a manner consistent with the Y samples interface configuration of FIG. 8, at least 8 previous X samples are needed in addition to the 6 warm-up bits, for a total of 6+8=14 bits before each subsector. Similarly, at least 7 subsequent X samples are needed in addition to the 6 cool-down bits, for a total of 6+7=13 bits after each subsector other than the final subsector A14, and at least 7 subsequent X samples are needed in addition to the 12 padding bits after the final subsector A14, for a total of 12+7=19 bits after the final subsector A14.

In the X sample arrangement illustrated in FIG. 9, the above-noted bit totals are rounded up to the nearest multiple of four. Accordingly, there are 16 warm-up bits preceding each subsector, 16 cool-down bits following each subsector other than the final subsector A14, and 20 padding bits following subsector A14. Such bit rounding is exemplary only, and in other embodiments other types of rounding can be used, such as rounding up to the nearest multiple of two, or rounding can be eliminated altogether. It should be noted that the bridging bits are also included for the split portions of subsector A1 as illustrated.

The particular sector configurations and numbers of bridging bits used in the foregoing example should not be construed as limiting in any way, and numerous alternative arrangements can be used, examples of which will be described in more detail below in conjunction with FIGS. 10 through 17. The particular number of bridging bits used between a given pair of subsectors of a stitched logic sector can be determined automatically by the subsector bridging control module 215 responsive to information such as, for example, the particular number of DFIR filter taps to be applied in a given retry mode of operation.

Figure 10A:
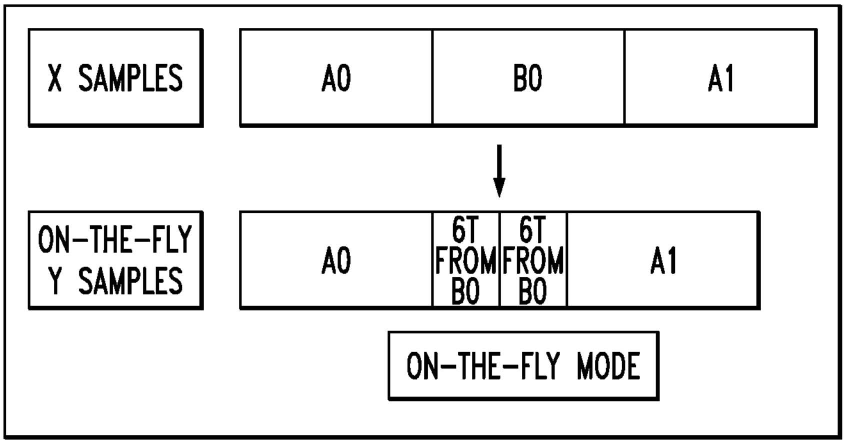
FIGS. 10A and 10B illustrate stitching of subsectors in respective on-the-fly and retry modes of operation.
Figure 10B:
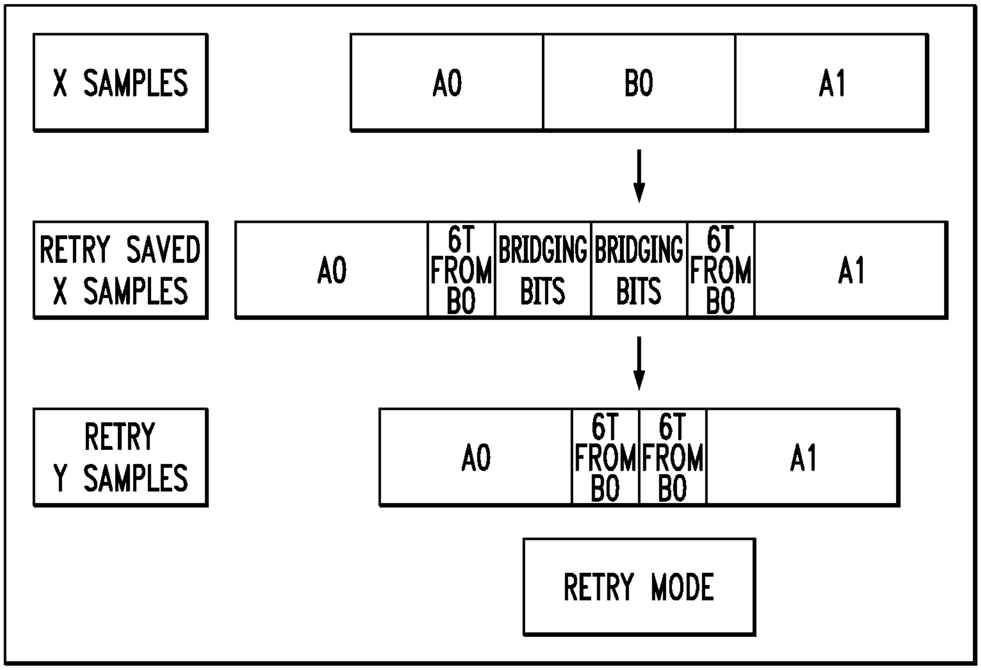

FIGS. 10A and 10B illustrate stitching of subsectors in respective on-the-fly and retry modes of operation in illustrative embodiments.

With regard to the on-the-fly mode as illustrated in FIG. 10A, the upper portion of the figure shows the interleaving of subsectors of X samples for two logic sectors A and B. The subsectors of the two logic sectors A and B are interleaved in the sequence A0, B0, A1 and so on as illustrated. The corresponding Y samples are shown in the lower part of the figure, and include 6 cool-down bits for subsector A0 and 6 warm-up bits for subsector A1, consistent with the exemplary Y samples configuration previously described in conjunction with FIG. 8. The 6 cool-down bits for subsector A0 come from subsector B0 and the 6 warm-up bits for subsector A1 also come from B0.

With regard to the retry mode as illustrated in FIG. 10B, the upper portion of the figure again shows the interleaving of subsectors of X samples for two logic sectors A and B. The middle portion of the figure shows the saved X samples for the retry mode with additional bridging bits inserted between the stitched subsectors A0 and A1 as illustrated. The corresponding Y samples for the retry mode are shown in the lower part of the figure, and again include 6 cool-down bits for subsector A0 and 6 warm-up bits for subsector A1, consistent with the exemplary Y samples configuration previously described in conjunction with FIG. 8. As in FIG. 10A, the 6 cool-down bits for subsector A0 come from subsector B0 and the 6 warm-up bits for subsector A1 also come from B0.

Figure 11A:
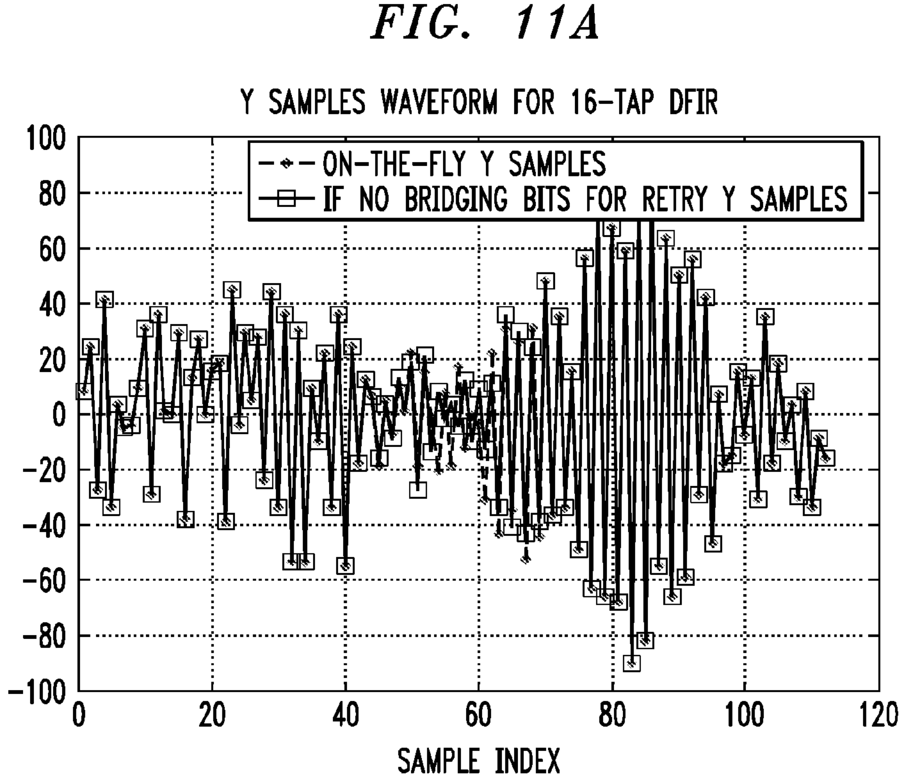
FIGS. 11A and 11B each compare Y samples in an on-the-fly mode of operation with Y samples in a retry mode of operation, for different subsector stitching arrangements.
Figure 11B:
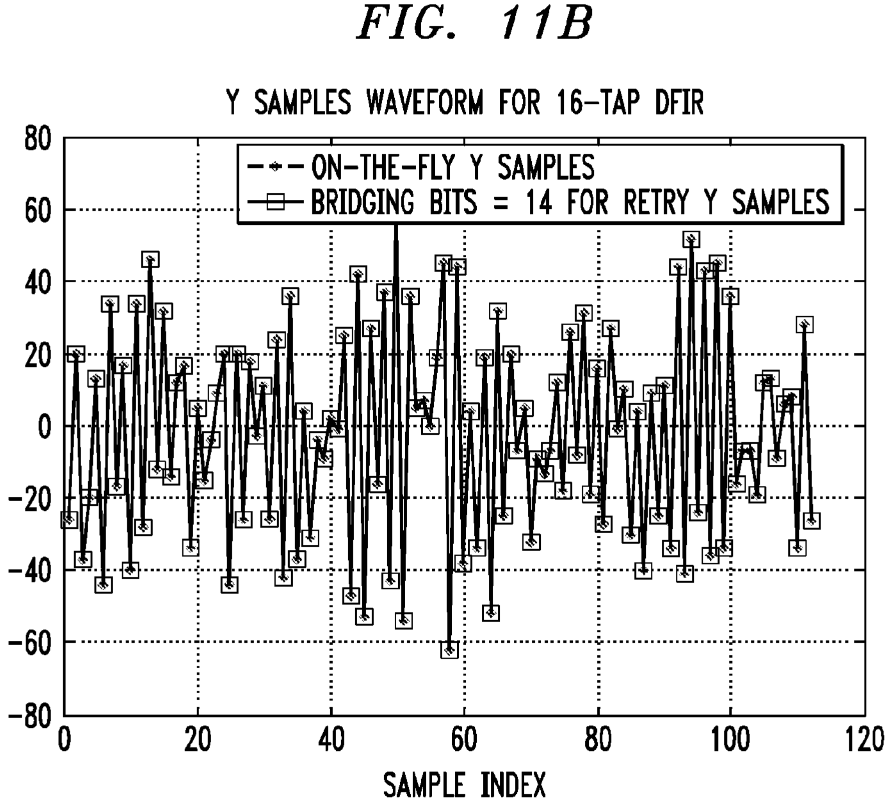

Referring now to FIGS. 11A and 11B, Y samples in an on-the-fly mode of operation are compared with Y samples in a retry mode of operation, for different subsector stitching arrangements. In the comparison of FIG. 11A, the retry Y samples are computed without using any additional bridging bits of the type shown in FIG. 10B. It can be seen that in this situation, the retry Y samples computed for certain sample index values deviate significantly from the corresponding on-the-fly Y samples, due at least in part to discontinuity problems of the type previously described. However, in the comparison of FIG. 11B, a total of 14 additional bridging bits are used in the manner illustrated in FIG. 10B, resulting in substantial elimination of the discontinuity problems and very close correspondence between the retry Y samples and the on-the-fly Y samples for all sample index values. The plots of FIGS. 11A and 11B are based on simulations and once again assume use of a 16-tap DFIR filter. These simulation results clearly indicate the significant improvements possible with use of additional bridging bits for X samples in retry mode.

As mentioned above, the number of bridging bits selected for use between pairs of adjacent subsectors of a stitched logic sector can be varied under control of the subsector bridging control module 115. Such control can be based at least in part on the number of DFIR taps as well as other information, possibly including estimated mean-squared error (MSE) between on-the-fly and retry Y samples, as will now be described in more detail with reference to FIGS. 12 and 13.

Figure 12:
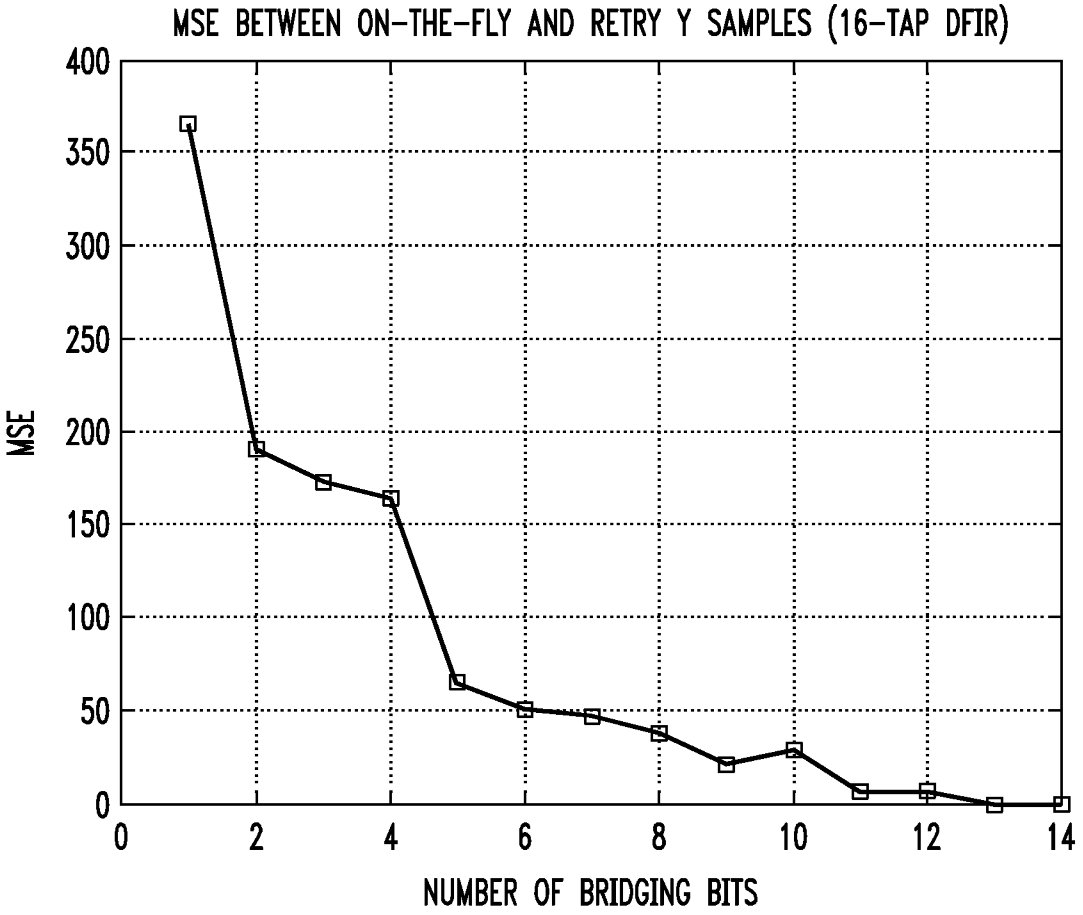
FIG. 12 shows a plot of mean-squared error (MSE) between on-the-fly mode Y samples and retry mode Y samples as a function of number of bridging bits for a 16-tap DFIR filter.
Figure 13:
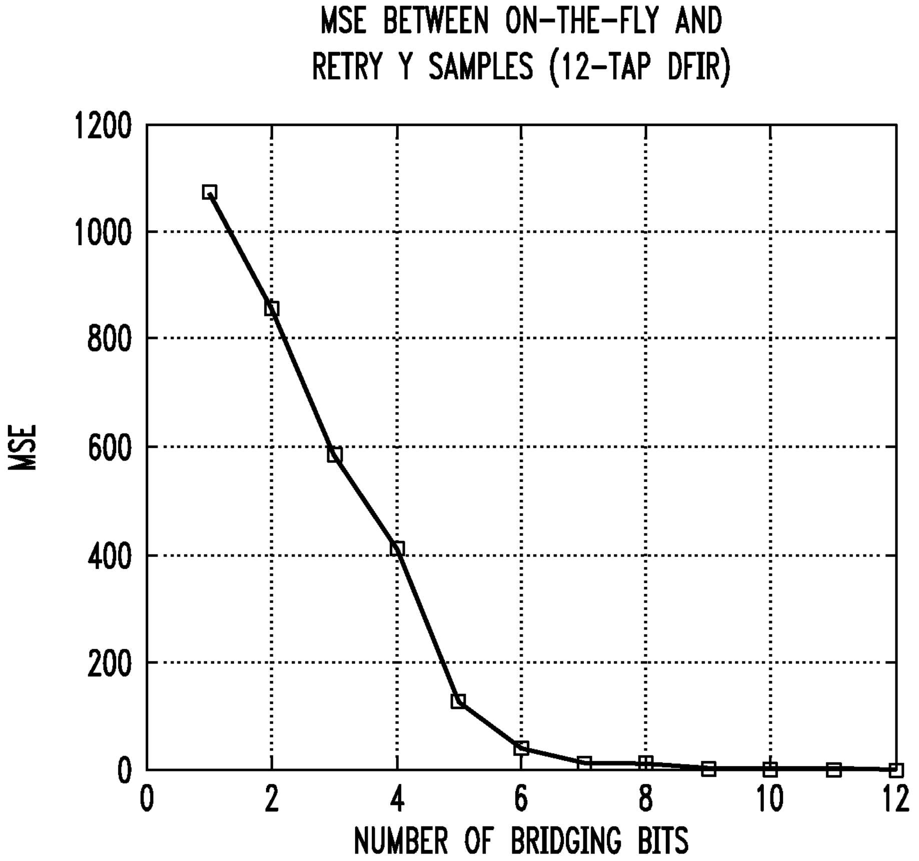
FIG. 13 shows a plot of MSE between on-the-fly mode Y samples and retry mode Y samples as a function of number of bridging bits for a 12-tap DFIR filter.

FIG. 12 shows the MSE between the on-the-fly and retry Y samples for the case of the exemplary 16-tap DFIR, based on the same simulations used to generate the comparison plots of FIGS. 11A and 11B. It can be seen that the MSE is reduced to zero using the 14 additional bridging bits arranged as illustrated in FIG. 10B. The number of bridging bits used in a given embodiment can be selected, for example, as the minimum number of bridging bits needed to achieve a particular acceptable level of MSE.

Again, the number of bridging bits used in a given embodiment can also vary depending on the number of DFIR filter taps. For example, with reference now to FIG. 13, MSE between the on-the-fly and retry Y samples is shown for the case of a 12-tap DFIR filter. It can be seen from the plot that fewer bridging bits are required in this embodiment to drive the MSE to a substantially zero level.

As a more particular example based on a 12-tap DFIR filter, assume that the filter includes taps T0 through T11, with the main tap being tap T5, such that to generate each Y sample y(n), 12 X samples x(n−6) to x(n+5) are used. These correspond to 6 previous and 5 subsequent X samples relative to the current sample. Accordingly, in order to ensure that each Y sample can be generated in a manner consistent with the Y samples interface configuration of FIG. 8, at least 6 previous X samples are needed in addition to the 6 warm-up bits, for a total of 6+6=12 bits before each subsector. Similarly, at least 5 subsequent X samples are needed in addition to the 6 cool-down bits, for a total of 6+5=11 bits after each subsector other than the final subsector A14, and at least 5 subsequent X samples are needed in addition to the 12 padding bits after the final subsector A14, for a total of 12+5=17 bits after the final subsector A14. As in the 16-tap DFIR example, the bit totals could be rounded up to the nearest multiple of four, resulting in 12 warm-up bits preceding each subsector, 12 cool-down bits following each subsector other than the final subsector A14, and 20 padding bits following subsector A14.

Additional examples of subsector stitching are illustrated in FIGS. 14 through 17, and will now be described in more detail.

Figure 14:
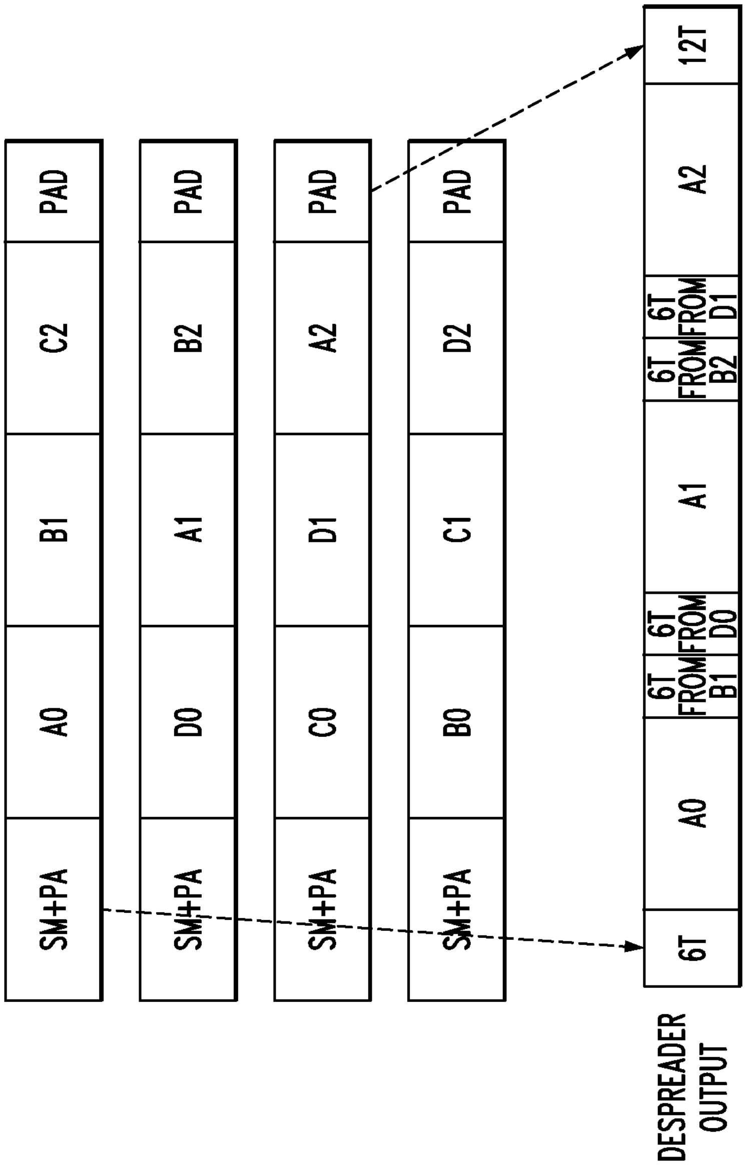
FIGS. 14 and 15 illustrate subsector stitching in respective non-split and split subsector cases for an on-the-fly mode of operation.
Figure 15:
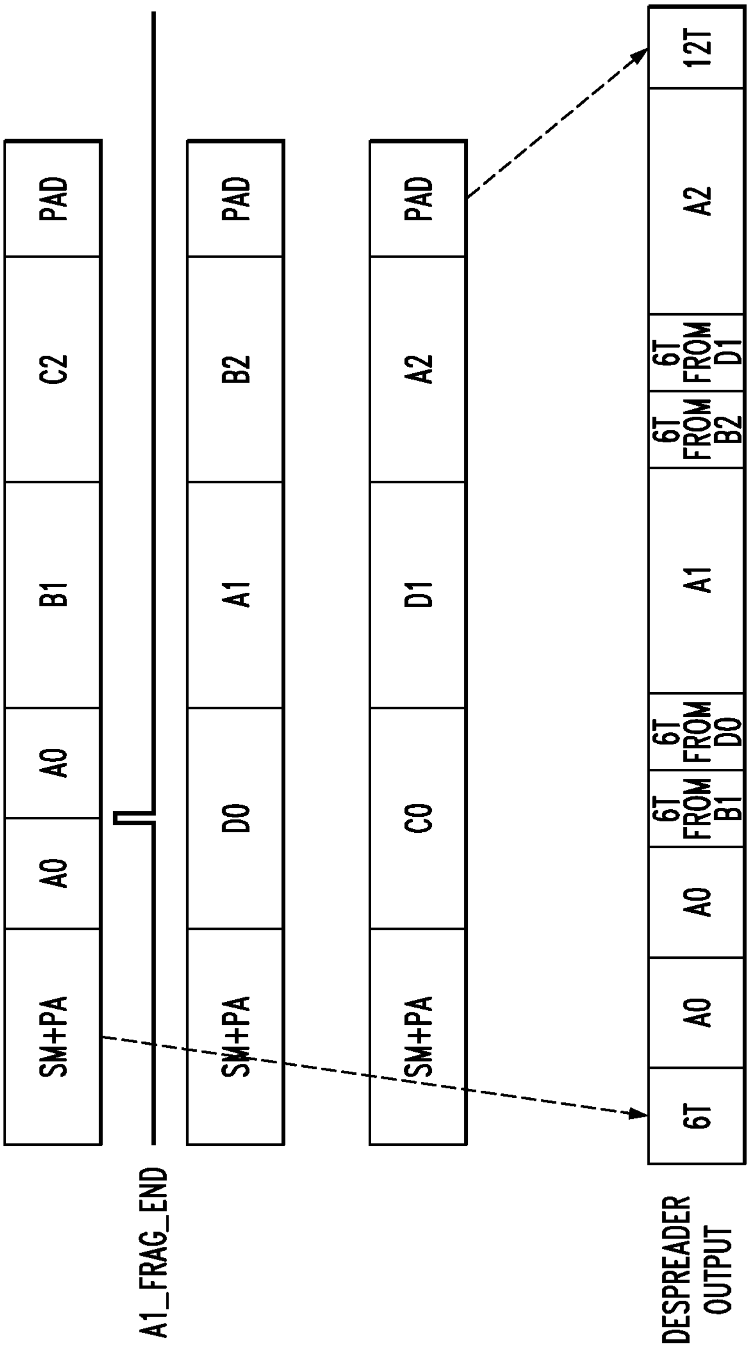

FIGS. 14 and 15 illustrate subsector stitching in respective non-split and split subsector cases for an exemplary on-the-fly mode of operation. In these examples, the media sector comprises multiple physical data sectors each starting with a field comprising a combination of a synchronization mark and a preamble (SM+PA), and ending with a field comprising additional padding bits (PAD). The subsectors are interleaved across the physical data sectors in the manner illustrated, such that the first data sector includes subsectors A0, B1 and C2, the second data sector includes subsectors D0, A1 and B2, the third data sector includes subsectors C0, D1 and A2, and the fourth data sector includes subsectors B0, C1 and D2. Thus, there are four logic sectors A, B, C and D in this example, each including three subsectors. The subsectors of the four logic sectors are interleaved with one another for storage in the physical data sectors arranged on a surface of the storage disk 104.

It is assumed that the logic sector to be stitched together from its subsectors for processing in the retry mode is logic sector A. The lower portion of FIG. 14 shows the output of despreader 210 using warm-up, cool-down and padding bits in an arrangement similar to that previously described in conjunction with FIG. 8. More particularly, subsector A0 includes 6 warm-up bits from the SM+PA field of the first data sector, and 6 cool-down bits from subsector B1. Subsector A1 includes 6 warm-up bits from subsector D0, and 6 cool-down bits from subsector B2. Subsector A2 includes 6 warm-up bits from subsector D1, and is followed by 12 padding bits from the PAD field of the third data sector.

The FIG. 14 arrangement corresponds to a non-split case, with no splitting of subsectors between disk fragments. An arrangement involving a split case is shown in FIG. 15, and illustrates a split of subsector A0 between two fragments. The demarcation point between the two fragments is indicated by a pulse in a signal denoted a1_frag_end. The despreader output in this split case is similar to that of the non-split case.

Figure 16:
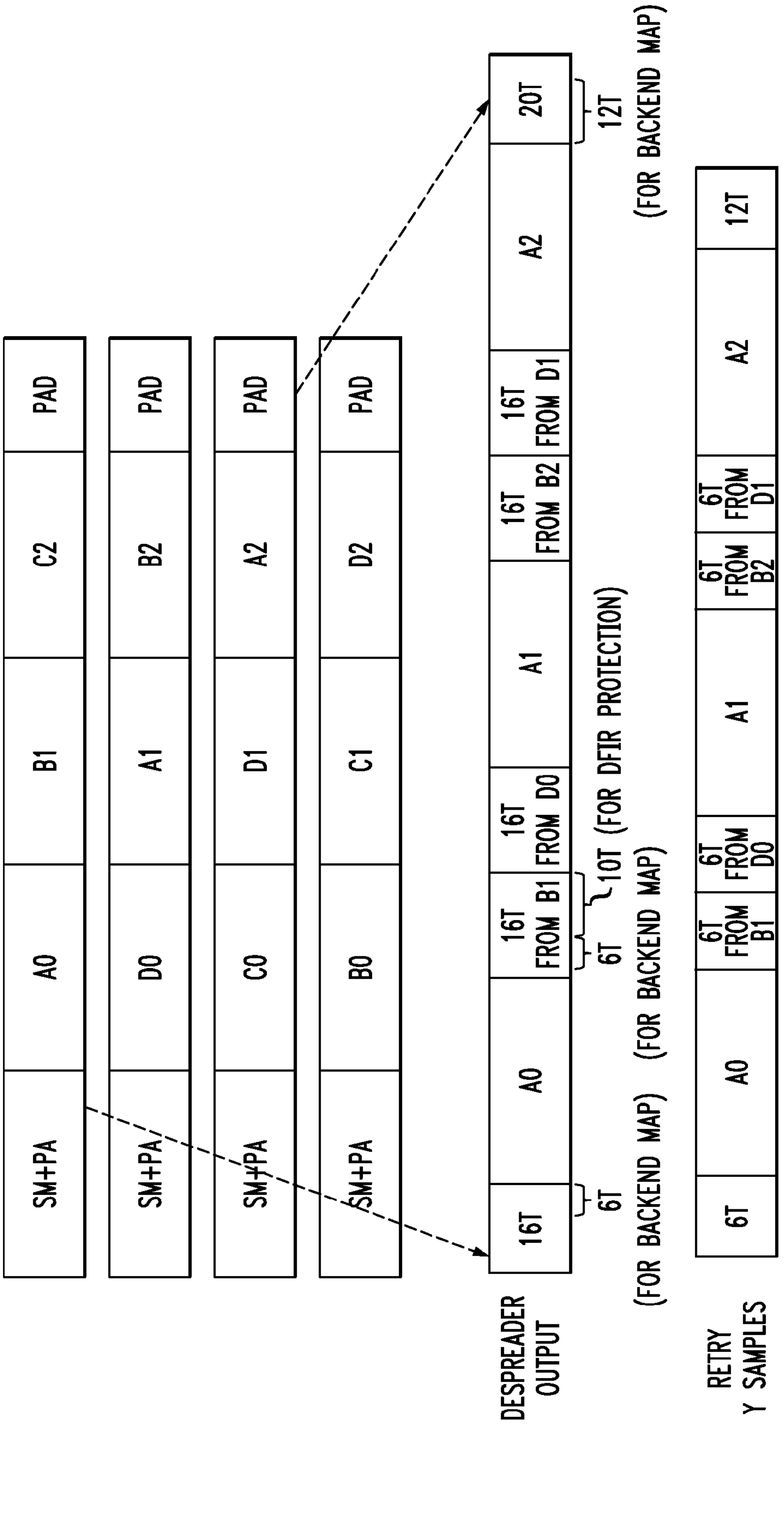
FIGS. 16 and 17 illustrate subsector stitching in respective non-split and split subsector cases for a retry mode of operation.
Figure 17:
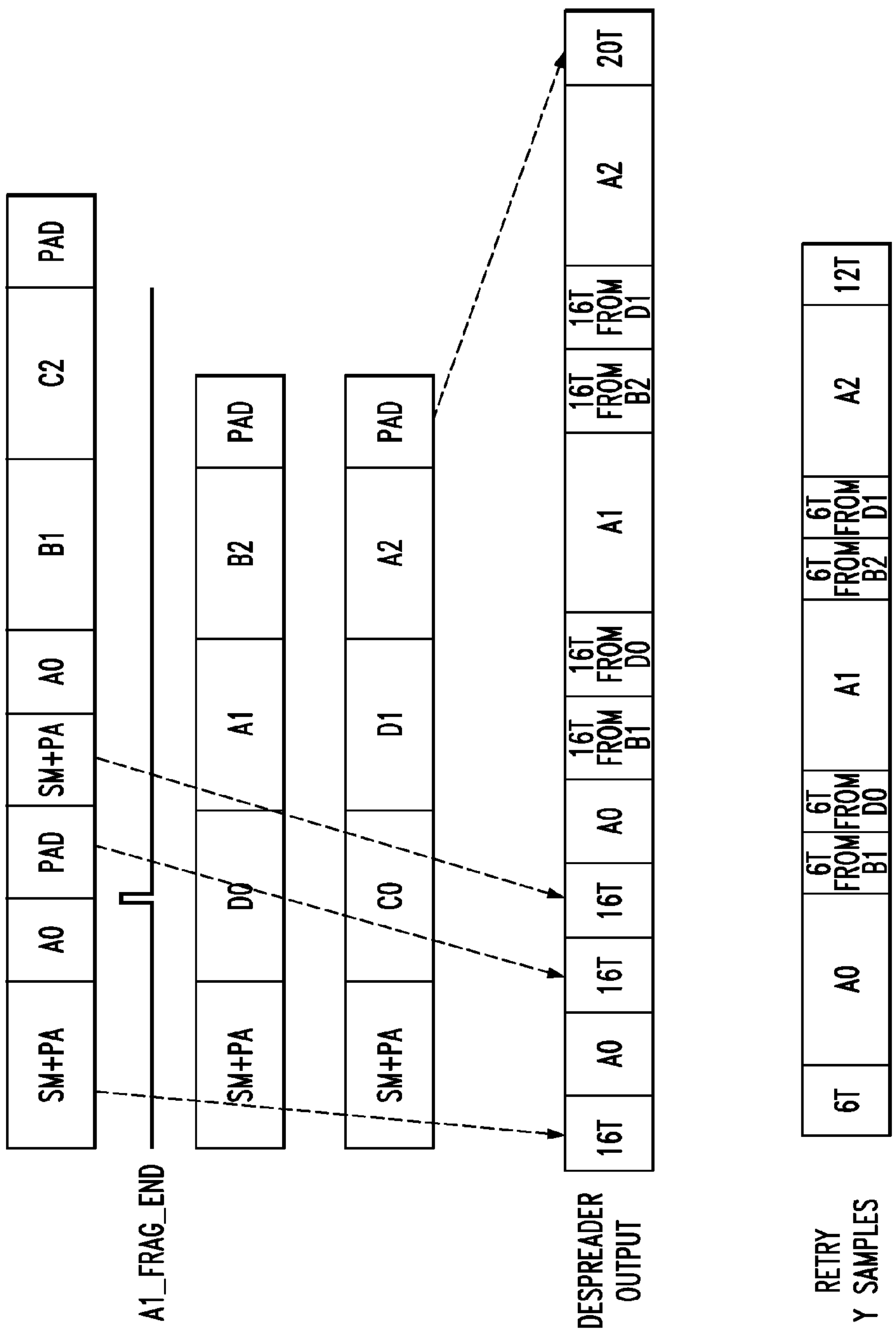

FIGS. 16 and 17 illustrate subsector stitching in respective non-split and split subsector cases for an exemplary retry mode of operation. The interleaving of the subsectors of logic sectors A, B, C and D in these examples is the same as previously described in conjunction with FIGS. 14 and 15.

With reference to the middle portion of FIG. 16, the despreader output for the stitched subsectors of logic sector A is shown, and includes 16 warm-up bits preceding each subsector, 16 cool-down bits following each subsector other than the final subsector A2, and 20 padding bits following subsector A2, consistent with the exemplary arrangement previously described in conjunction with FIG. 9.

Also as indicated in the middle portion of FIG. 16, 6 of the 16 warm-up bits and 6 of the 16 cool-down bits associated with subsector A0 are utilized for backend maximum a posteriori (MAP) detection. The remaining 10 bits of the 16 cool-down bits associated with subsector A0 are utilized for protection of DFIR computation. In addition, 12 bits of the 20 padding bits following subsector A2 are utilized for backend MAP detection. Other types of detection can be used in other embodiments.

The middle portion of FIG. 17 shows the despreader output for the stitched subsectors of logic sector A in the split case, and is similar to that of FIG. 16, except that the split portions of subsector A0 are also separated from one another by bridging bits. In this arrangement, the bridging bits between the split portions of subsector A0 come from the SM+PA and PAD fields associated with the split as shown in the top portion of the figure.

The retry Y samples shown at the lower portions of FIGS. 16 and 17 have substantially the same format as the on-the-fly mode despreader output of FIGS. 14 and 15. Accordingly, there is no performance degradation in this exemplary retry mode attributable to subsector discontinuities, as continuity protection has been provided using the bridging bits as determined by the subsector bridging control module 215.

One or more of the embodiments of the invention provide significant improvements in disk-based storage devices as well as other types of storage devices. For example, by utilizing appropriate numbers of bridging bits determined based on DFIR filter taps or other related information, discontinuities between stitched sectors that might otherwise arise when computing retry Y samples can be entirely avoided, leading to improved system performance in retry modes of operation.

It is to be appreciated that the particular circuitry and module blocks, logic sector and subsector configurations, interleaving techniques, bridging bits, operating modes and other features described in conjunction with FIGS. 3 through 17 are presented by way of example only, and other embodiments of the invention may utilize numerous other arrangements of additional or alternative features for implementing subsector stitching functionality in a storage device as disclosed herein.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including shingled magnetic recording (SMR), bit-patterned media (BPM), heat-assisted magnetic recording (HAMR), microwave-assisted magnetic recording (MAMR), and multi-dimensional recording techniques such as two-dimensional magnetic recording (TDMR) can be used in one or more embodiments of the invention. Accordingly, embodiments of the invention are not limited with regard to the particular types of storage media, recording mechanisms and storage formats that are used in a given storage device.

Figure 18:
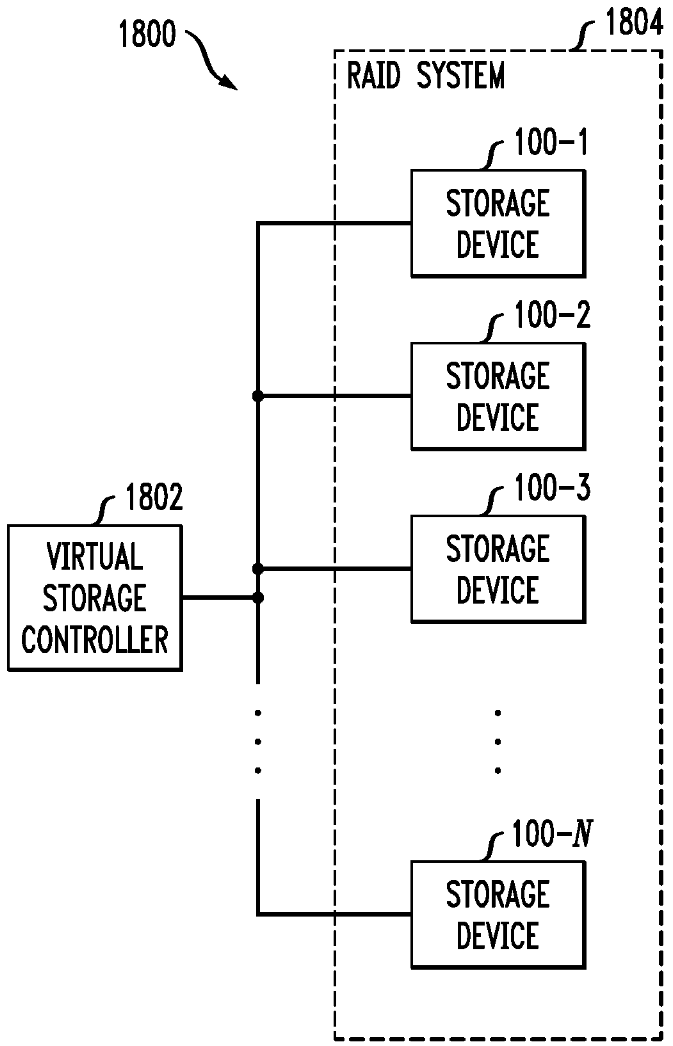
FIG. 18 shows a virtual storage system incorporating a plurality of disk-based storage devices of the type shown in FIG. 1.

Multiple storage devices 100-1 through 100-N possibly of various different types may be incorporated into a virtual storage system 1800 as illustrated in FIG. 18. The virtual storage system 1800, also referred to as a storage virtualization system, illustratively comprises a virtual storage controller 1802 coupled to a RAID system 1804, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include subsector stitching functionality as disclosed herein. These and other virtual storage systems comprising HDDs or other storage devices of the type disclosed herein are considered embodiments of the invention.

Again, it should be emphasized that the above-described embodiments of the invention are intended to be illustrative only. For example, other embodiments can use different types and arrangements of storage media, read/write heads, read channel circuitry, preamplifiers and other storage device components for implementing the described subsector stitching functionality. Also, the particular manner in which subsectors are stitched together, as well as the number and type of bridging bits used for subsector stitching and the particular storage device operating modes in which subsector stitching is utilized, may be varied in other embodiments. These and numerous other alternative embodiments within the scope of the following claims will be apparent to those skilled in the art.

What is claimed is:

1. An apparatus comprising:

read channel circuitry adapted for coupling to a read/write head of a storage device;

wherein the read channel circuitry comprises:

a despreader configured to generate a stitched logic sector by stitching together subsectors of that logic sector that were interleaved with subsectors of other logic sectors for storage on a storage medium of the storage device; and a subsector bridging control module associated with the despreader and configured to control a number of bridging bits inserted by the despreader between a given pair of adjacent subsectors of the stitched logic sector.

2. The apparatus of claim 1 wherein the read channel circuitry further comprises:

analog frontend circuitry configured to receive an analog read signal from the read/write head via a preamplifier of the storage device;

an analog-to-digital converter configured to convert the analog read signal to a digital read signal; and digital finite impulse response (DFIR) filter circuitry comprising at least one DFIR filter configured to process X samples of the digital read signal to generate Y samples.

3. The apparatus of claim 1 wherein the stitched logic sector comprises X samples that are provided to a DFIR filter for use in generating Y samples in a retry mode of operation.

4. The apparatus of claim 3 wherein the read channel circuitry further comprises an averaging module and the retry mode of operation utilizes an X-averaging operation performed by the averaging module.

5. The apparatus of claim 3 wherein the X samples further comprise X samples from multiple distinct digital read signal streams.

6. The apparatus of claim 5 wherein the X samples further comprise averaged X samples generated using the X samples from the multiple distinct digital read signal streams.

7. The apparatus of claim 1 wherein the subsector bridging control module is configured to cause the despreader to insert a sufficient number of bridging bits between each pair of adjacent subsectors of the stitched logic sector so as to prevent stitching boundary discontinuities that might otherwise arise from use of X-averaging in generation of Y samples from X samples in a retry mode of operation.

8. The apparatus of claim 1 wherein the number of bridging bits to be inserted between the given pair of adjacent subsectors of the stitched logic sector is determined automatically by the subsector bridging control module as a function of a number of taps included in a DFIR filter to be applied to the stitched logic sector in a retry mode of operation.

9. The apparatus of claim 8 wherein the DFIR filter comprises a 16-tap DFIR filter and the subsector bridging control module causes the despreader to insert 16 warm-up bits preceding each subsector, 16 cool-down bits following each subsector other than a final subsector, and 20 padding bits following the final subsector.

10. The apparatus of claim 8 wherein the DFIR filter comprises a 12-tap DFIR filter and the subsector bridging control module causes the despreader to insert 12 warm-up bits preceding each subsector, 12 cool-down bits following each subsector other than a final subsector, and 20 padding bits following the final subsector.

11. The apparatus of claim 1 wherein the subsector bridging control module is further configured to control a number of bridging bits inserted by the despreader between a given pair of adjacent portions of a split subsector of the stitched logic sector.

12. The apparatus of claim 1 wherein the subsector bridging control module is at least partially incorporated within the despreader.

13. The apparatus of claim 1 wherein the read channel circuitry is fabricated in at least one integrated circuit.

14. A method comprising the steps of:

receiving a read data signal;

generating a stitched logic sector from the read data signal by stitching together subsectors of that logic sector that were interleaved with subsectors of other logic sectors for storage on a storage medium; and controlling a number of bridging bits inserted between a given pair of adjacent subsectors of the stitched logic sector.

15. The method of claim 14 wherein the stitched logic sector comprises X samples that are provided to a DFIR filter for use in generating Y samples in a retry mode of operation.

16. The method of claim 14 wherein controlling the number of bridging bits comprises controlling insertion of a sufficient number of bridging bits between each pair of adjacent subsectors of the stitched logic sector so as to prevent stitching boundary discontinuities that might otherwise arise from use of X-averaging in generation of Y samples from X samples in a retry mode of operation.

17. The method of claim 14 wherein controlling the number of bridging bits comprises automatically determining the number of bridging bits to be inserted between the given pair of adjacent subsectors of the stitched logic sector as a function of a number of taps included in a DFIR filter to be applied to the stitched logic sector in a retry mode of operation.

18. An article of manufacture comprising a computer-readable storage medium having computer program code embodied therein, wherein the computer program code when executed causes the storage device to perform the method of claim 14.

19. A storage device comprising:

a storage medium;

a read/write head; and read channel circuitry coupled to the read/write head;

the read channel circuitry comprising:

a despreader configured to generate a stitched logic sector by stitching together subsectors of that logic sector that were interleaved with subsectors of other logic sectors for storage on the storage medium; and a subsector bridging control module associated with the despreader and configured to control a number of bridging bits inserted by the despreader between a given pair of adjacent subsectors of the stitched logic sector.

20. A virtual storage system comprising the storage device of claim 19.

* * * * *